US011951593B2

(12) United States Patent
Simone et al.

(10) Patent No.: US 11,951,593 B2
(45) Date of Patent: Apr. 9, 2024

(54) SYSTEM AND METHOD FOR GRIT BLASTING AN ANNULAR JUNCTION PORTION OF A PIPELINE AND LAYING VESSEL COMPRISING SAID SYSTEM (71) Applicant: SAIPEM S.P.A., San Donato Milanese (IT)

(72) Inventors: Francesco Simone, San Donato Milanese (IT); Maurizio De Santo, San Donato Milanese (IT); Paolo Murgo, San Donato Milanese (IT)

(73) Assignee: SAIPEM S.P.A., San Donato Milanese (IT)

(*) Notice: Subject to any disclaimer, the term of this patent is extended or adjusted under 35 U.S.C. 154(b) by 514 days.

(21) Appl. No.: 17/276,712

(22) PCT Filed: Sep. 18, 2019

(86) PCT No.: PCT/IB2019/057867
§ 371 (c)(1),
(2) Date: Mar. 16, 2021

(87) PCT Pub. No.: WO2020/058876
PCT Pub. Date: Mar. 26, 2020

(65) Prior Publication Data
US 2022/0032424 A1 Feb. 3, 2022

(30) Foreign Application Priority Data
Sep. 18, 2018 (IT) .................. 102018000008687

(51) Int. Cl.
B24C 3/32 (2006.01)
B24C 3/06 (2006.01)
B24C 5/06 (2006.01)

(52) U.S. Cl.
CPC ............... B24C 3/32 (2013.01); B24C 3/06 (2013.01); B24C 5/068 (2013.01)

(58) Field of Classification Search
CPC .. B24C 5/068; B24C 5/06; B24C 3/32; B24C 3/06; B24C 1/086; B24B 27/003;
(Continued)

(56) References Cited

U.S. PATENT DOCUMENTS 2,460,989 A 2/1949 Kraner
3,362,109 A 1/1968 Wallace
(Continued)

FOREIGN PATENT DOCUMENTS

GB 2 090 553 A 7/1982
JP S51 105686 U 8/1976
WO WO 2009/090526 A2 7/2009

OTHER PUBLICATIONS

Notification Concerning Submission, Obtention or Transmittal of Priority Document for International Application No. PCT/IB2019/057867 dated Jan. 20, 2020.
(Continued)

Primary Examiner — Lee D Wilson
Assistant Examiner — Alberto Saenz
(74) Attorney, Agent, or Firm — Neal, Gerber & Eisenberg LLP (57) ABSTRACT A system for grit blasting an annular junction portion of a pipeline extending along a longitudinal axis on board a laying vessel, comprises at least one carriage configured to advance along an annular path about the pipeline; at least one centrifugal turbine, which is configured to project grit towards the pipeline, rotates about a rotation axis lying on a plane orthogonal to the longitudinal axis and is supported by the carriage; at least one feed device configured to feed the grit to the centrifugal turbine and comprising a hopper which
(Continued)

extends along a respective axis, defines a feed chamber and is coupled to the respective carriage and a guide device configured to act in conjunction with the hopper to feed the grit to the centrifugal turbine at all the operating positions of the carriage.

48 Claims, 8 Drawing Sheets

(58) Field of Classification Search
CPC ....... B08B 13/0436; B08B 9/021; B08B 9/00;
B08B 9/02; B08B 9/023; B08B 9/04;
B08B 9/043; B08B 9/049; F16L 1/206
USPC .......................................... 451/91, 92, 95, 99
See application file for complete search history.

(56) References Cited

U.S. PATENT DOCUMENTS

| | | | |
|---|---|---|---|
| 5,134,810 A | | 8/1992 | Carpenter |
| 5,191,740 A * | | 3/1993 | Rose .......................... B24C 3/32 |
| | | | 451/92 |
| 7,331,846 B1 * | | 2/2008 | Shimizu .................... B24C 3/32 |
| | | | 451/92 |
| 9,415,426 B1 * | | 8/2016 | Blake ....................... B08B 3/024 |
| 2016/0207167 A1 * | | 7/2016 | Daykin ................... B08B 13/00 |

OTHER PUBLICATIONS

International Search Report and Written Opinion for International Application No. PCT/IB2019/057867 dated Jan. 2, 2020.

\* cited by examiner

SYSTEM AND METHOD FOR GRIT BLASTING AN ANNULAR JUNCTION PORTION OF A PIPELINE AND LAYING VESSEL COMPRISING SAID SYSTEM

PRIORITY CLAIM

This application is a national stage application of PCT/IB2019/057867, filed on Sep. 18, 2019, which claims the benefit of and priority to Italian Patent Application No. 102018000008687, filed on Sep. 18, 2018, the entire contents of which are each incorporated by reference herein.

TECHNICAL FIELD

The present disclosure relates to a system and method for grit blasting an annular junction portion of a pipeline and laying vessel comprising said system.

BACKGROUND

Submarine pipelines for transporting hydrocarbons are laid on the bed of a body of water by laying vessels, each of which is configured to assemble the pipeline on board and to launch the same as the pipeline is assembled. The laying vessel therefore comprises assembly equipment and a launching ramp for the so-called "S" launching or a launching tower to perform the so-called "J" launching. The initials "S" and "J" identify the type of launching in relation to the shape of the pipeline during launching due to the reactions transmitted between the pipeline, the laying vessel and the bed of the water body. The so-called "S" launching is particularly suitable for laying pipelines on relatively medium low beds, while the so-called "J" launching is suitable for laying pipelines on relatively deep beds.

The pipelines used to transport hydrocarbons are made up of sections of pipe joined together to cover total lengths of the order of hundreds of kilometres.

The pipe sections have a unit length, usually 12 meters, and relatively large diameters between 0.2 and 1.5 metres. Each section of pipe comprises: a hollow steel cylinder, single or multilayer in the case of an inner coating of anti-corrosion alloy; a first coating in single and/or multilayer polymer material, which has the function of protecting the steel pipe; a possible second coating in gunite or cement, whose function is to weigh down and mechanically protect the pipeline. In some applications the second coating is not necessary and the pipe sections and submarine pipelines are devoid thereof.

The free and opposite ends of each pipe section are devoid of the first and second coatings to enable the steel cylinders to be welded together. The uncoated end portion is referred to as the "cutback".

On board the laying vessel, the pipe sections are joined to pipe sections of unit length or multiple length (i.e., already joined to other pipe sections).

The operation of joining the pipe sections involves welding the steel cylinders generally in multiple welding passes. Once a welding ring has been made between two steel cylinders, an annular junction portion without the first and second coatings extends astride the weld.

The annular junction portion, therefore, is substantially defined by the free ends of the pipe sections and extends axially between two end edges of the first coating.

Several operations are performed on the annular junction portion.

The annular junction portion must be suitably treated and subsequently covered with at least one protective coating that adheres to the annular junction portion and the edges of the pre-existing coatings. These operations, when performed "in the field", are generally identified with the expression "Field Joint Coating".

The preparation of the annular junction portion involves eliminating rust and other residues, bringing the surface of the same to a roughness compatible with the coating layers that will be subsequently applied.

The elimination of rust and residues is carried out by removal, based on the high-speed mechanical impact of a grit of suitable size. This is usually referred to as grit blasting or sandblasting.

Operations on the annular junction portion may be performed on board the launching vessel in a limited number of processing stations distributed along an advancement path of the pipe sections (generally referred to as a "launching line" or "firing line"). In addition, other different machining processes are also carried out at these stations.

As the space available on launching vessels is relatively extremely limited, processing stations are particularly congested.

A grit blasting system of a known type is described in PCT Patent Publication No. WO2009090526: such a system includes a sandblasting machine comprising four centrifugal wheels with a rotational axis parallel to that of the pipeline, fully covering the circumference of the pipeline and with axial movement thereof on a carriage. However, this solution is not adaptable to different pipeline diameters.

SUMMARY

It is therefore a purpose of the present disclosure to provide a system for grit blasting an annular junction portion of a pipeline that adapts to the spaces available on the launching vessel, the diameter of the pipeline and, at the same time, ensures that the grit blasting is performed relatively accurately and reliably, minimizing the time required for the process.

In accordance with such purposes, the present disclosure relates to a system for grit blasting an annular junction portion of a pipeline, extending along a longitudinal axis on board a laying vessel; the system comprising at least one carriage configured to advance along an annular path around the pipeline; at least one centrifugal turbine, which is configured to project grit at the pipeline and has a rotational axis lying on a plane orthogonal to the longitudinal axis, supported by the carriage; at least one feed device configured to feed grit to the centrifugal turbine comprising a hopper, which extends along a respective axis, defines a feed chamber and is coupled to the respective carriage, and a guide device configured to act in conjunction with the hopper to feed grit to the centrifugal turbine at all operating positions of the carriage. In this way, feeding of the grit is relatively guaranteed in all the operating positions of the carriage along the annular path. In addition, while advancing around the pipeline, the centrifugal turbine maintains an orientation that ensures that the relatively high-speed grit blast is always orthogonal to the surface portion on which it impacts so as to take advantage of the maximum length of the blast. In this way the grit blasting is efficient and homogeneous.

In more detail, the hopper has a structure symmetrical to the axis and is, in certain embodiments, provided with an outlet and at least one inclined wall configured to convey the grit housed in the feed chamber to the outlet.

In more detail, the hopper is provided with a lid configured to selectively close the feed chamber.

According to one embodiment, the hopper axis coincides with the rotational axis of the centrifugal turbine.

According to a further embodiment, the hopper is coupled directly to the centrifugal turbine. In more detail, the guide device comprises at least one first separator septum housed within the hopper feed chamber and configured to define at least two feed chamber compartments adapted to house the grit.

In more detail, the first separator septum comprises at least a first inclined portion configured to convey the grit housed in the compartments towards the outlet during movement of the carriage along the annular path.

According to certain embodiments, the guide device comprises at least one second separator septum housed within the hopper feed chamber placed at a distance from the first separator septum so as to define at least three feed chamber compartments adapted to house the grit.

In more detail, the second separator septum comprises at least one inclined portion configured to convey the grit housed in the compartments to the outlet during movement of the carriage along the annular path.

According to one embodiment, the first separator septum and the second separator septum are symmetrical with respect to the hopper axis.

According to a further variant of the present disclosure, the guide device comprises an articulated mechanism configured to keep the hopper in a position within a range of safety positions during the advancement of the carriage along the annular path; the range of safety positions being defined so as to ensure that the feed of the grit can be made by gravity and without spillage of grit during movement of the carriage along the annular path. This prevents the spillage of grit during the advancement of the carriage and the hopper is positioned to enable gravity feeding. In more detail, the hopper is open and not coaxial with the centrifugal turbine.

In more detail, the feed device comprises a conduit configured to connect the hopper to the centrifugal turbine and, in certain embodiments, is flexible. In this way, the connection between the hopper and the centrifugal turbine is not affected by the movements of the hopper.

In more detail, the articulated mechanism comprises a piston rod coupled to the hopper outlet and an actuator device coupled to the hopper inlet.

In a first embodiment, the actuator device comprises two actuators coupled to the sides of a hopper inlet mouth.

In a second embodiment the actuator device comprises at least one movement guide and at least one arm coupled to the hopper inlet and provided with an end mobile along the movement guide. The moving guide extends along a portion of a substantially annular trajectory.

In more detail, the piston rod is hollow so as to house at least a portion of the respective conduit.

According to a first embodiment, the carriage is configured so that the carriage can swing in a controlled manner about an axis parallel to the longitudinal axis of the pipeline. In this way, the upper/lower positions of the outer surface of the annular junction portion of the pipeline that cannot be made to face the carriage, for example due to system construction limits, can still be grit blasted using an inclined blast.

Alternatively, the centrifugal turbine is mounted on the respective carriage so as to swing in a controlled manner about an axis parallel to the longitudinal axis of the pipeline.

In more detail, the system comprises at least two guides configured to define complementary portions of the annular path; at least two frames, which support the guides and are selectively mobile in a direction transverse to the longitudinal axis of the pipeline. In this way, the annular path is broken up to enable the housing and passage of the pipeline and recomposed around the same to enable the sliding of the carriage.

In more detail, the centrifugal turbine is provided with an outlet mouth, which is elongated in a direction parallel to the longitudinal axis of the pipeline. In this way, the grit blasting does not require any axial movement of the turbine and the circular movement around the pipeline alone is sufficient. This greatly simplifies the system.

According to one embodiment, the carriage is provided with a slide configured to support the turbine and an adjustment guide engaged in a sliding manner by the slide. The slide is in certain embodiments mobile along a radial direction relative to the longitudinal axis to enable adjustment of the position of the turbine relative to the pipeline. In this way it is possible to adjust the position of the turbine based on the dimensions of the pipeline. This makes the system according to the present disclosure relatively easily adaptable to different pipeline diameters.

In more detail, the system comprises at least: a further carriage configured to advance along the annular path around the pipeline; at least one further centrifugal turbine, which is configured to project grit at the pipeline with a further rotational axis lying on a plane orthogonal to the longitudinal axis of the pipeline, supported by the further carriage; at least one further feed device configured to feed grit to the further turbine; the carriage and the further carriage being mobile along respective guides. In this way, blasting times are reduced.

In more detail, the further feed device comprises a further hopper and a further articulated mechanism configured to hold the further hopper in a position within a further range of safety positions during the movements of the further carriage along the annular path. The further feed device may also comprise a further conduit, such as a flexible conduit, configured to connect the further hopper to the further centrifugal turbine. In this way, both carriages operate safely avoiding spillages of grit and uncontrolled movements of the pipelines, ensuring the grit blasting of the entire annular junction portion.

In more detail, the carriage and the further carriage may be arranged 180° to each other and/or have symmetrical configuration along the annular path. In this way the carriages work on distinct portions of the annular junction portion without overlapping.

In more detail, the carriage and the further carriage are substantially identical and the centrifugal turbine and the further centrifugal turbine are substantially identical.

In more detail, each frame comprises two respective substantially C-shaped plates, which support respective half-rings. Each guide comprises two respective substantially identical half-rings, spaced apart and arranged parallel to each other on planes orthogonal to the longitudinal axis. In this way the guides define a double annular support for the carriage or carriages.

In more detail, each half-ring is provided with a coupling face fixed to the respective plate, an outer face provided with a groove and a toothed inner edge; wherein the carriage is provided with at least one pinion, configured to engage the inner edge of the respective half-ring and driven by a respective electric motor.

In more detail, the carriage comprises a strut and two arms; each arm has a first end fixed to a respective end of the strut and a second end, opposite the first end, which engages in a sliding manner in a respective groove of the respective half-ring. In this way, the carriage is stable during movement along the annular path based on the two support points.

In more detail, the system comprises a casing, which defines a process chamber, and is divided into two half-shells coupled to the respective movable frames. This creates a process chamber substantially separated from the external environment and ensures relatively improved working conditions for operators outside the chamber in terms of noise and dust.

It is a further object of the present disclosure to provide a launching vessel comprising a system for grit blasting an annular junction portion of a pipeline described above. This way, the reduced system footprint provides that more space is available to perform further operations.

Lastly, it is a further object of the present disclosure to provide a method for grit blasting an annular junction portion of a pipeline extending along a longitudinal axis, the method comprising: advancing at least one carriage along an annular path around the pipeline; the carriage supports at least one centrifugal turbine, which is configured to project grit at the pipeline and rotates about a rotational axis lying on a plane orthogonal to the longitudinal axis; at least one feed device configured to feed grit to the centrifugal turbine comprising a hopper which extends along a respective axis, defines a feed chamber and is coupled to the respective carriage and a guide device configured to cooperate with the hopper to feed grit to the centrifugal turbine at all operating positions of the carriage. In this way, the grit blasting is carried out in a relatively homogeneous, simple and rapid manner without spillages of grit.

BRIEF DESCRIPTION OF THE FIGURES

Further features and advantages of the present disclosure will become clear from the following description of a non-limiting example of an embodiment made with reference to the appended drawings, wherein.

DETAILED DESCRIPTION

Figure 1:
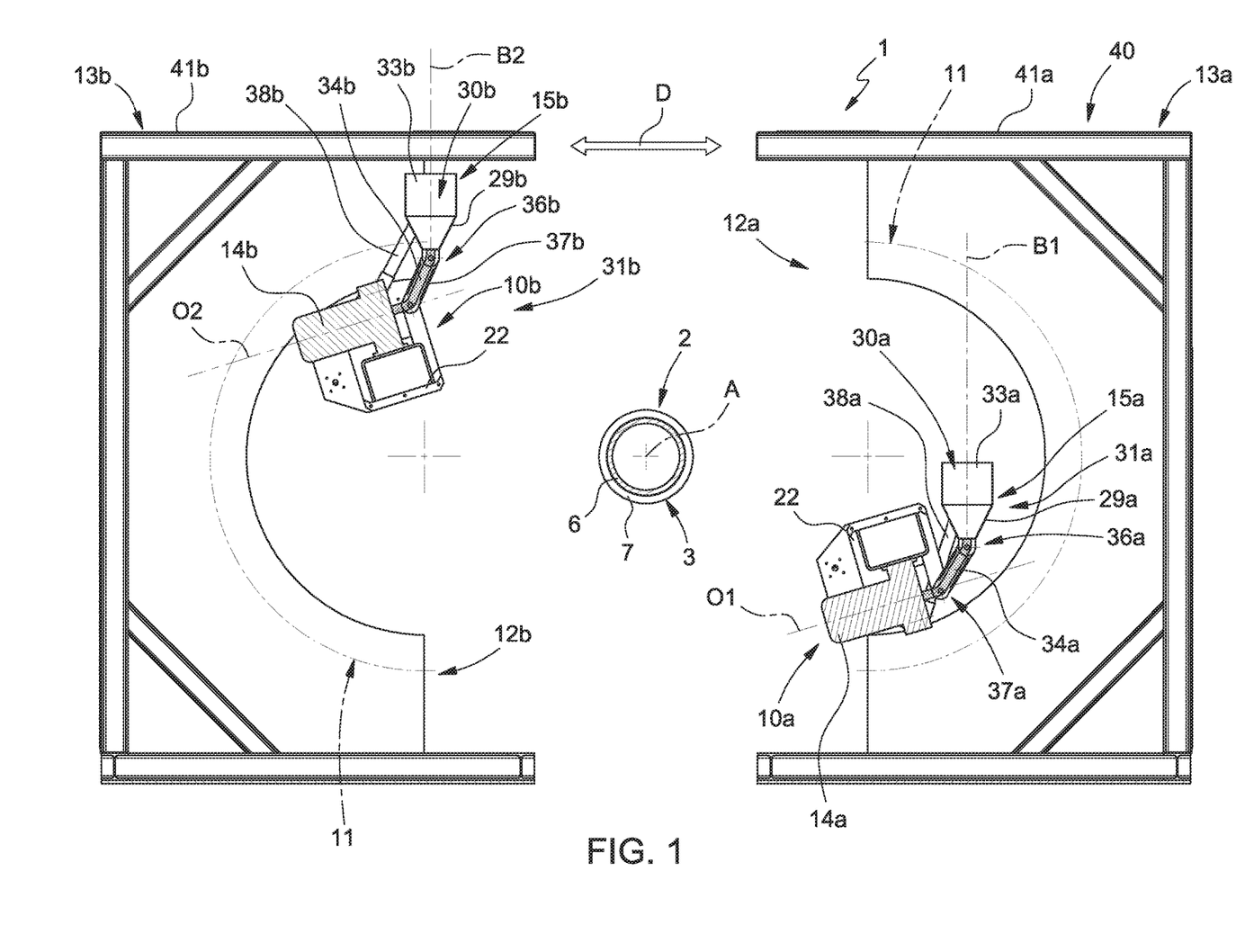
FIG. 1 is a schematic view with parts in cross-section and with parts removed for clarity, of a system for grit blasting an annular junction portion of a pipeline on board a launching vessel according to the present disclosure.

In FIG. 1 reference numeral 1 denotes a system configured to grit blast an annular junction portion 2 of a pipeline 3.

Figure 2:
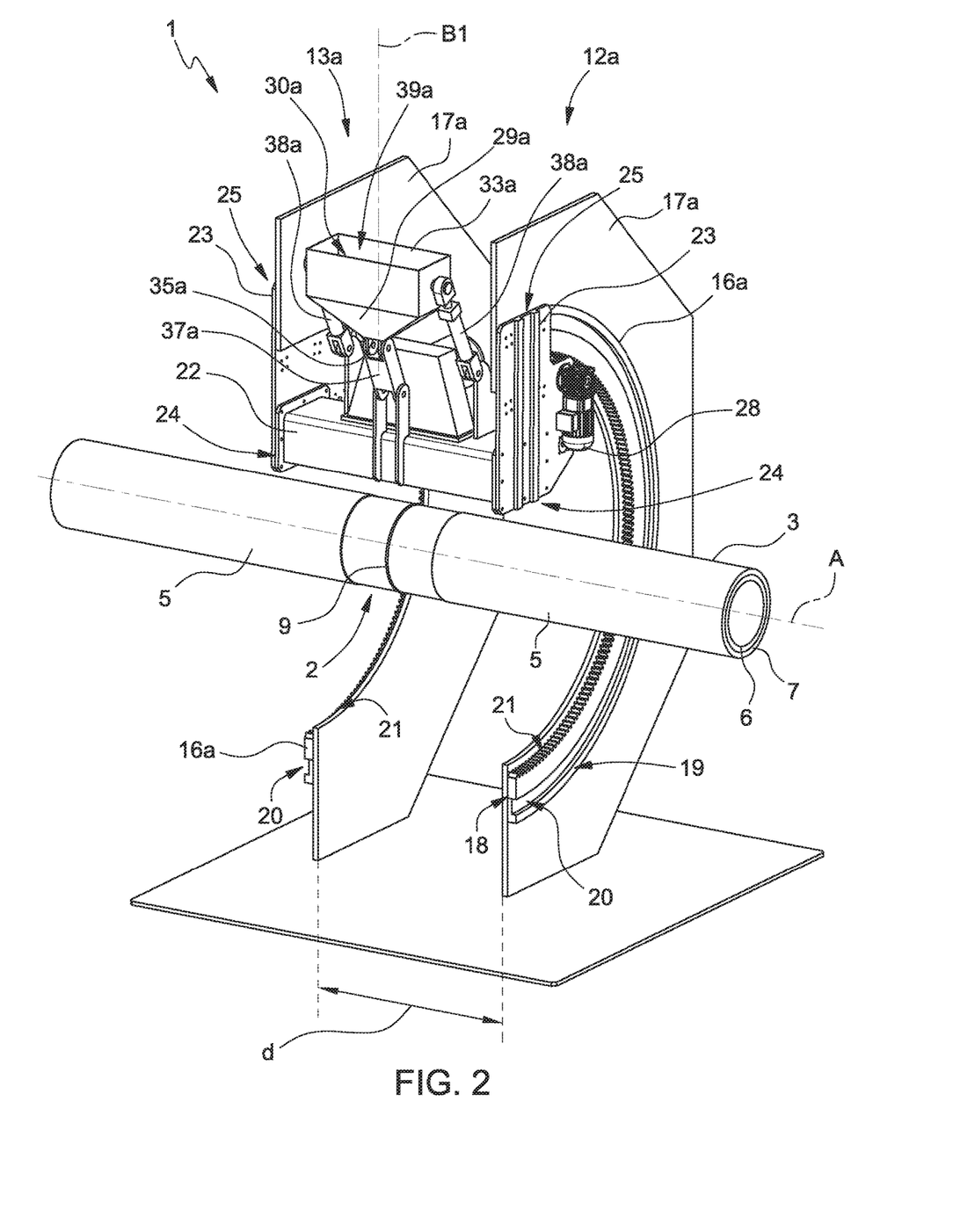
FIG. 2 is a schematic perspective view, with parts removed for clarity, of a first detail of the system in FIG. 1.
Figure 3:
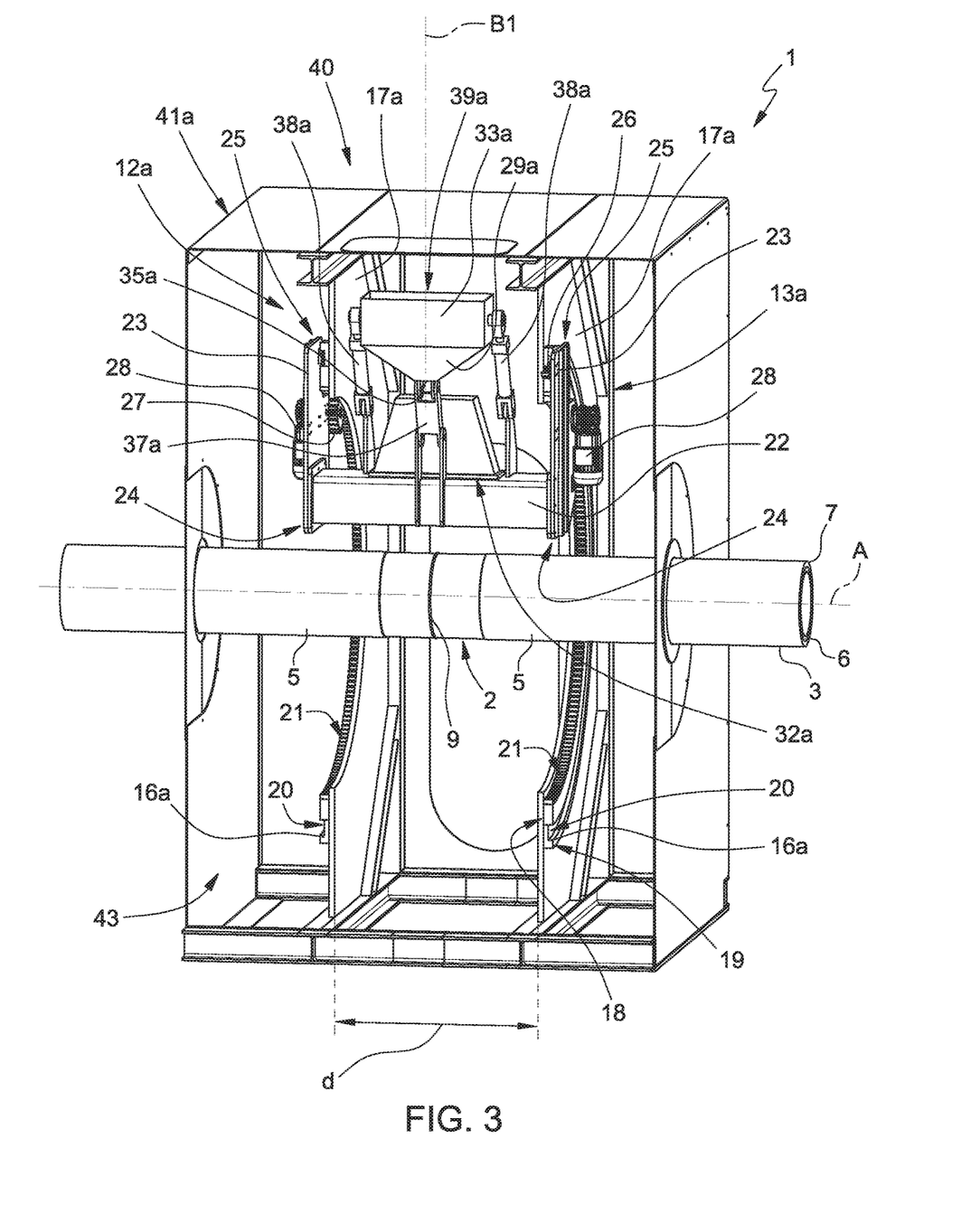
FIG. 3 is a schematic perspective views, with parts removed for clarity, of a second detail of the system in FIG. 1.

With reference to FIG. 2 and FIG. 3, the pipeline 3 extends along a longitudinal axis A and comprises at least two sections 5 coupled to each other.

In the non-limiting example described and illustrated herein, the sections 5 are coated with at least one polymer coating 6, which has the function of protecting the steel pipe from corrosion and a further coating 7 in gunite or cement, whose function is to weigh down and mechanically protect the pipeline.

The coupling zone between the two sections 5 defines an annular junction portion 2 of variable amplitude, generally referred to as a "cutback", which is treated differently from the remaining portions of the sections 5.

In the annular junction portion 2 there is a welding ring 9 between the two sections 5.

The annular junction portion 2 is treated using the system 1 according to the present disclosure before being coated.

With reference to the non-limiting example described and illustrated in FIG. 1, the system 1 configured to grit blast an annular junction portion 2 comprises:
  two carriages 10a 10b mobile along an annular path 11 around the pipeline 3;
  two guides 12a 12b configured to define complementary portions of the annular path 11;
  at least two frames 13a 13b, each supporting a respective guide 12a 12b;
  two centrifugal turbines 14a 14b, each supported by a respective carriage 10a 10b;
  two feed devices 15a 15b, each of which is coupled to a respective carriage 10a 10b and is configured to feed grit to a respective centrifugal turbine 14a 14b.

The annular path 11 is concentric to the pipeline 3.

In certain embodiments, the carriage 10a is mobile along the guide 12a, while the carriage 10b is mobile along the guide 12b.

In certain embodiments, the carriage 10a and the carriage 10b are arranged 180° to each other.

In certain embodiments, the frames 13a 13b, the centrifugal turbines 14a 14b, the carriages 10a 10b, the feed devices 15a 15b are substantially identical to each other.

With reference to FIGS. 2 and 3 in which only a portion of the system 1 is visible, in certain embodiments, each guide 12a 12b, comprises two respective identical half-rings 16a 16b, spaced apart and arranged parallel to each other (in FIGS. 2 and 3, only the half-rings 16a of the guide 12a are visible for simplicity).

Each half-ring 16a, 16b is supported by a respective plate 17a, 17b of the frames 13a, 13b (in FIGS. 2 and 3, only the plates 17a of the frame 13a are visible for simplicity). The plates 17a, 17b are substantially C-shaped and are in certain instances placed at a distance d greater than the axial length of the annular junction portion 2.

Each half-ring 16a, 16b is provided with a coupling face 18 (not clearly visible in the figures) fixed to the respective plate 17a, 17b, of an outer face 19 provided with a groove 20 and a toothed inner edge 21.

In certain embodiments, the half-rings 16a, 16b of the respective guides 12a, 12b lie on two planes orthogonal to the longitudinal axis A supported by the respective frames 13a, 13b.

The frames 13a, 13b are movable along the same direction D transverse to the longitudinal axis A of the pipeline 3 as schematically indicated by the arrows in FIG. 1. In this way, the frames 13a, 13b move away from each other to enable the loading and passage of the pipeline 3 to be launched without limitation in diameter (configuration of FIG. 1) and approach each other until the half-rings 16a, 16b of the guides 12a, 12b substantially join to define the annular path 11 around the pipeline 3 (configuration not shown).

With reference to FIGS. 2 and 3, (in which only the carriage 10a is visible for simplicity), each carriage 10a and 10b comprises a strut 22 and two arms 23. As will be seen in detail below, in the non-limiting example described herein and illustrated, the centrifugal turbine 14a, 14b is coupled to the strut 22.

Each arm 23 has a first end 24 fixed to a respective end of the strut 22 and a second end 25, opposite the first end 24, which engages in a sliding manner in a respective groove 20 of the respective half-ring 16.

In particular, the second end 25 is provided with at least one or more rollers 26 (partially visible only in FIG. 3) that extend from the arm 23 to engage the groove 20.

Each arm 23 is further provided with at least one pinion 27 (partially visible only in FIG. 3) configured to engage the inner edge 21 of the respective half-ring 16a, 16b and driven by a respective electric motor 28.

In use, as will be seen in detail below, the controlled and synchronized actuation of the electric motors 28 of the arms 23 of each carriage 10a, 10b determines the movement of the carriage 10a, 10b along the guide 12a, 12b defining the annular path 11.

A variant not illustrated provides that each carriage 10a, 10b is further coupled to the respective guide 12a, 12b so as to be able to swing in a controlled manner about an axis parallel to the longitudinal axis A.

A further variant not illustrated provides that the strut 22 of the carriage 10a, 10b is configured to swing in a controlled manner about an axis parallel to the longitudinal axis A.

A further variant not illustrated provides that the centrifugal turbine 14a, 14b is mounted on the respective carriage 10a, 10b so as to swing in a controlled manner about an axis parallel to the longitudinal axis A.

With reference to FIG. 1, each centrifugal turbine 14a, 14b is configured to project grit at the pipeline 3 and rotate about a respective rotational axis O1, O2 lying on a plane perpendicular to the longitudinal axis A of the pipeline 3.

Each centrifugal turbine 14a, 14b is further provided with a plurality of vanes (not illustrated for simplicity) rotating about the rotational axis O1, O2.

With reference to FIGS. 2 and 3, each centrifugal turbine 14a, 14b is provided with a respective outlet mouth 32a, 32b elongated in a direction parallel to the longitudinal axis A of the pipeline 3. The working distance between the outlet mouth 32a, 32b of the centrifugal turbine 14a, 14b and the annular junction portion 2 is optimized according to the geometry of the outlet mouth itself so as to enable machining on different diameters of the pipeline 3.

In addition, the geometry of the grit blast impacting the pipeline 3 may be varied by suitable adjustable vanes (not illustrated in the figures) placed at the outlet or inside the outlet mouth 32a, 32b. In this way, axial movements of the centrifugal turbines 14a, 14b are not necessary to grit blast the entire annular junction portion 2, unless an initial setting is made. This relatively greatly simplifies the structure of the system 1 according to the present disclosure.

In the embodiment illustrated in FIGS. 1 to 5, the working distance is defined during assembly by appropriate pre-setting.

As will be seen in detail below, in the embodiment of FIGS. 6 to 9, the working distance is instead adjustable in a relative simple and immediate manner.

The centrifugal turbines 14a, 14b turn at relatively high speed. As such and in accordance with the centrifugal force generated by each centrifugal turbine 14a, 14b abrasive grit is ejected through the outlet mouth 32a 32b, against the walls of the annular junction portion 2. In certain embodiments, metal abrasives such as steel balls (generally referred to as "shots") or sharp grit (generally referred to as steel "grits") of variable size, available in different hardnesses, are used. The size and shape of the grit play a significant role in the depth of penetration. In this way, the grit is ejected at high speed onto the annular junction portion 2 substantially orthogonally to the outer surface of the annular junction portion 2 during the movement of the carriages 10a and 10b.

With reference to FIGS. 1-5, each feed device 15a, 15b comprises a hopper 33a, 33b extending along a longitudinal axis B1, B2 and coupled to the respective carriage 10a, 10b, and a guide device 31a, 31b configured to act in conjunction with the hopper 33a, 33b to feed the grit to the respective centrifugal turbine 14a, 14b at all operating positions of the carriage 10a, 10b.

In certain embodiments, the hopper 33a, 33b defines a feed chamber 30a, 30b adapted to contain the grit and open and non-coaxial with the respective centrifugal turbine 14a, 14b. In certain such embodiments, the hopper 33a, 33b is provided with at least one inclined wall 29a, 29b configured to convey the grit housed in the feed chamber 30a, 30b to the outlet 35a, 35b. In certain such embodiments, the inclined wall 29a, 29b defines the respective outlet 35a, 35b.

In detail, the guide device 31a, 31b comprises an articulated mechanism 36a, 36b configured to maintain the hopper 33a, 33b substantially in a position within a range of safety positions during the movement of the carriage 10a, 10b along the annular path 11.

In certain embodiments, the safety device 31a, 31b also comprises a conduit 34a, 34b (FIG. 1) configured to connect the outlet 35 of the hopper 32a, 32b to the respective centrifugal turbine 14a, 14b.

Figure 4:
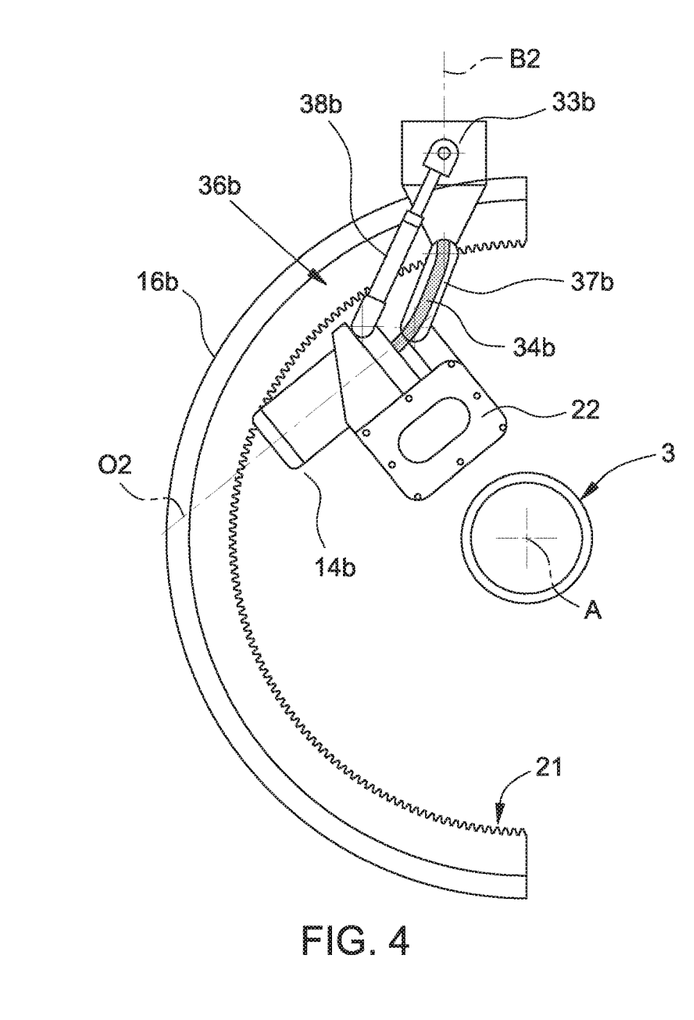
FIGS. 4 and 5 are schematic views with parts in cross section and parts removed for clarity of the first detail in different operating positions.
Figure 5:
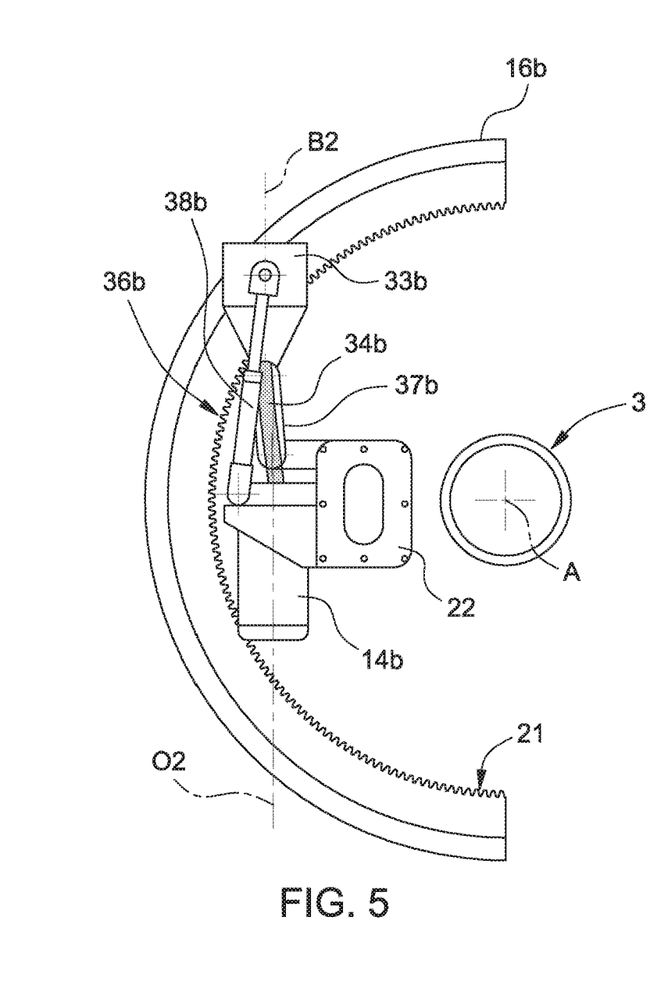

The range of safety positions is defined in such a way as to ensure that the feeding of the grit to the centrifugal turbine can be made by gravity and without spillages of grit during the movement of the carriage 10a, 10b along the annular path 11.

In the non-limiting example described herein and illustrated, the position of the hopper 33a, 33b is substantially vertical. In other words, during the movement of the carriage 10a, 10b along the annular path 11 the hopper 33a, 33b maintains a substantially vertical position.

It should be appreciated that the range of safety positions is defined as the range of permissible angles formed between the axis of the hopper B1, B2 and the vertical direction. In the non-limiting example described and illustrated herein, the angle formed between the axis of the hopper B1 and B2 and the vertical direction may be between 0 and 45°.

Further, the articulated mechanism 36a, 36b is configured to maintain the hopper 33a, 33b at an optimal distance and working angle relative to the rotational axis O1, O2 of the respective centrifugal turbine 14a, 14b. In particular, the articulated mechanism 36a, 36b comprises a piston rod 37a, 37b coupled to the outlet 35a, 35b of the hopper 33a, 33b and the carriage 10a, 10b and an actuator device 38a, 38b, coupled to the inlet 39a, 39b of the hopper 33a, 33b.

In the non-limiting example described and illustrated herein, the piston rod 37a, 37b is hollow and the actuator device 38a, 38b comprises two actuators coupled to the sides of the inlet 39a, 39b of hopper 33a, 33b.

Inside the piston rod 37a, 37b the conduit 34a, 34b is housed. In certain embodiments, the conduit 34a 34b is flexible. In this way the conduit 34a 34b is protected and guided by the piston rod 37a, 37b and cannot assume uncontrolled geometries.

With reference to FIG. 1 and FIG. 3, in certain embodiments, the system 1 according to the present disclosure comprises a casing 40 (partially visible in FIGS. 1 and 3), which is divided into two half-shells 41a, 41b coupled to the respective mobile frames 13a, 13b. In use, when the frames 13a, 13b approach the half-shells 41a, 41b they form the casing 40 around the pipeline 3. This creates a process chamber 43 substantially separate from the external environment that ensures improved working conditions for operators outside the process chamber 43 in terms of noise and dust.

In certain embodiments, the process chamber 43 is connected to an aspiration system (not illustrated for simplicity) comprising a dust treatment device.

In certain embodiments, the system 1 according to the present disclosure is further equipped with a recovery device (not illustrated for simplicity), configured to collect heavy sandblasting residues, transport them outside the launch line and separate the recoverable abrasive material from the non-recoverable material. The recovery system may be mechanical and take advantage of gravity, or the recovery system may be pneumatic.

In certain embodiments, the system 1 according to the present disclosure is also equipped with a treatment plant (not illustrated for simplicity), configured to treat the abrasive material collected by the recovery device so that the abrasive material can be reintroduced into the feeding devices 15a, 15b. The treatment of recovered abrasive material can be carried out by vortex separation systems, bag filters and dust management systems.

In use, the frames 13 to 13b move towards each other so that the guides 12a, 12b create the annular path 11 around the annular junction portion 2 of the pipeline 3.

The centrifugal turbines 14a, 14b are activated and at the same time the carriages 10a, 10b are moved along the respective guides 12a 12b so as to treat distinct parts of the annular junction portion 2. As illustrated in FIG. 1, the carriages 10a, 10b are arranged at 180° to each other and are moved so that there is no overlap of treatment by the centrifugal turbines 14a, 14b.

Finally, the zones of the annular junction portion 2 facing the end portions of the guides 12a 12b are suitably treated based on the swinging movement of the carriages 10a, 10b or of the centrifugal turbines 14a 14b as previously described. In the example illustrated, in such areas the outlet mouth 32a 32b of the respective centrifugal turbine 14a, 14b cannot face directly in the orthogonal direction as in other areas. It should be appreciated that based on the controlled swinging, it is also possible to adequately treat these areas.

FIGS. 6 to 9 illustrate, in part, a system 100 configured to grit blast an annular junction portion 2 of a pipeline 3 on board a launching vessel according to a variant of the present disclosure.

The system 100 differs from the system 1 substantially in two aspects, mainly relating to the feeding of the grit and the positioning of the centrifugal turbine.

Hereinafter, the same reference numbers used in FIGS. 1-5 will be used to indicate the same or similar parts.

Figure 6:
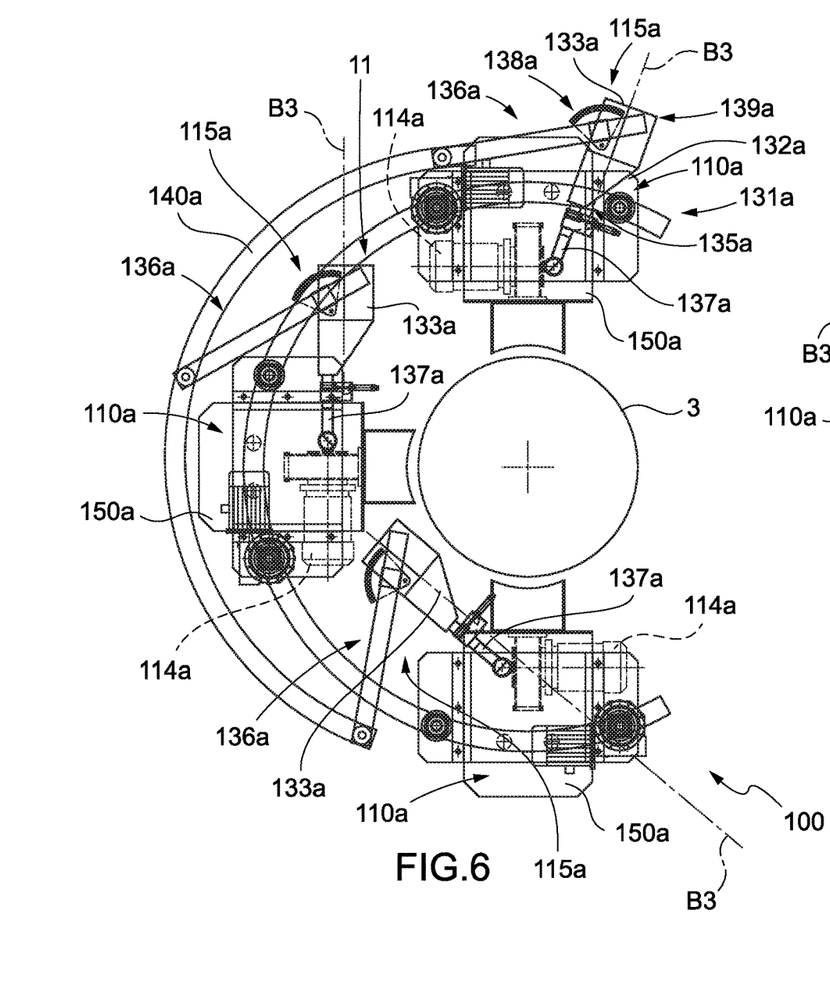
FIGS. 6 and 7 are schematic views of a system for grit blasting an annular junction portion of a pipeline on board a launching vessel according to a variant of the present disclosure in different operating positions.
Figure 7:
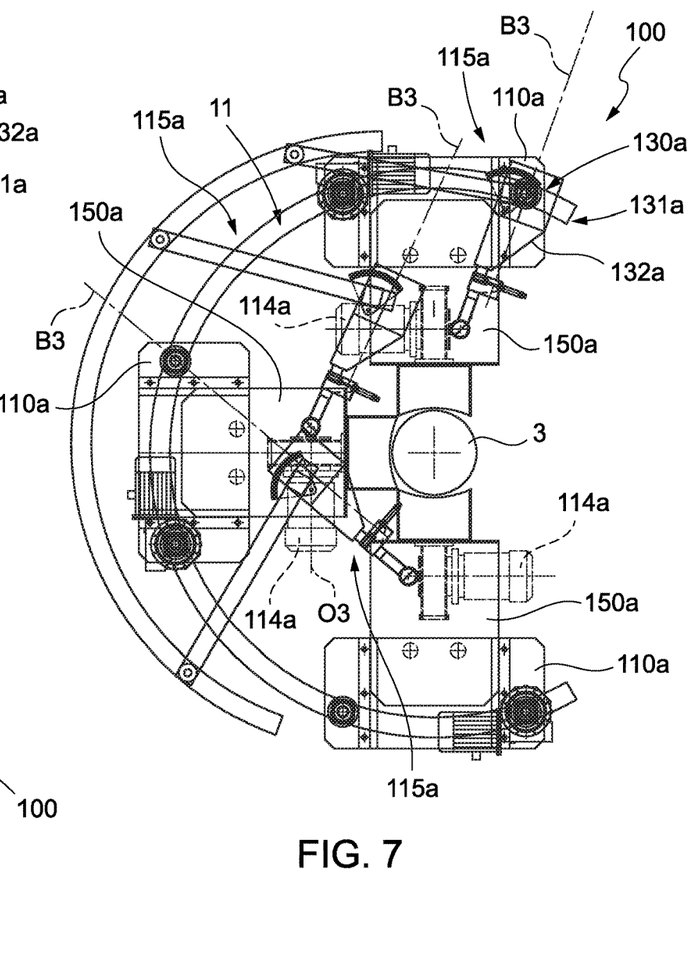

With reference to FIG. 6 and FIG. 7, the system 100 is provided with a carriage 110a, mobile along the annular path 11 and configured to support a respective centrifugal turbine 114a, and a feeding device 115a configured to feed the grit to the respective centrifugal turbine 114a. FIGS. 6-9 illustrate a single turbine 114a, a single carriage 110a, and a single feeding device 115a for simplicity.

It is understood that the system 100 has a structure similar to that described for the system 1 and therefore is provided with at least one further carriage, one further turbine and one further feeding device.

The centrifugal turbine 114a is configured to project grit at the pipeline 3 and rotate about a respective rotational axis O3 lying on a plane perpendicular to the longitudinal axis A of the pipeline 3. The feeding device 115a comprises a hopper 133a, extending along a longitudinal axis B3 and coupled to the carriage 110a, and a guiding device 131a configured to act in conjunction with the hopper 133a so as to ensure the feeding of the grit in all the operating positions of the carriage 110a.

In certain embodiments, the hopper 133a defines a feeding chamber 130a suitable to contain the grit and is open and non-coaxial with the respective centrifugal turbine 114a. The hopper 133a is also provided with an outlet 135a.

In certain embodiments, the hopper 133a is provided with at least one inclined wall 132a configured to convey the grit housed in the feeding chamber 130a to the outlet 135a. In certain embodiments, the inclined wall 132a defines the respective outlet 135a.

In detail, the guiding device 131a comprises an articulated mechanism 136a configured to hold the hopper 133a in a position within a range of safety positions while advancing the carriage 110a along the annular path 11.

Figure 8:
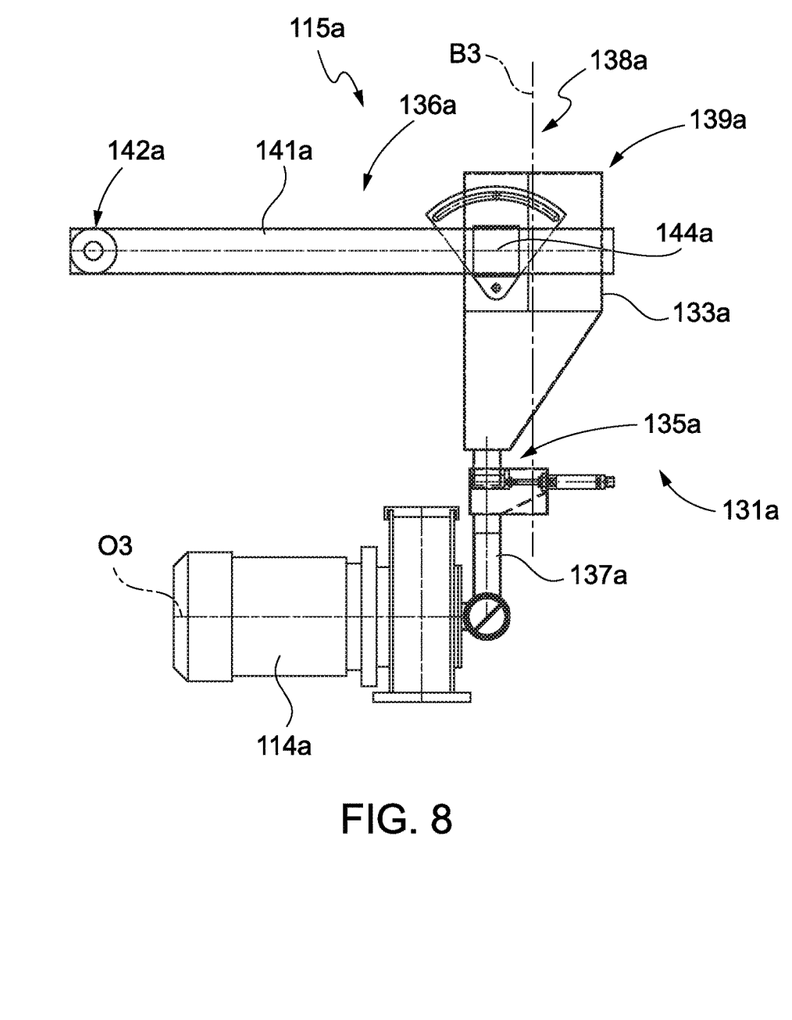
FIGS. 8 and 9 are schematic views, with parts removed for clarity, of two respective details of the system shown in FIGS. 6 and 7.

Specifically and with particular reference to FIG. 6 and FIG. 8, the articulated mechanism 136a comprises a piston rod 137a coupled to the outlet 135a of the hopper 133a and an actuator device 138a coupled to the inlet 139a of the hopper 133a.

The actuator device 138a comprises at least one moving guide 140a (visible only in FIGS. 6 and 7) and at least one arm 141a coupled to the inlet 139a of the hopper 133a and provided with an end 142a mobile along the moving guide 140a. In particular, the arm 141a slides inside a ring 144a hinged in the proximity of the inlet 139a of the hopper 133a. In this way, during the movement of the carriage 110a the arm 141a, guided by the moving guide 140, determines the positioning of the hopper 133a in the range of safety positions. As already stated for the system 1, the range of safety positions is defined in such a way as to ensure that the feeding of the grit to the centrifugal turbine 114a can be made by gravity and without spillages of grit during movement of the carriage 110a along the annular path 11.

In the non-limiting example described herein and illustrated, the position of the hopper 133a is substantially vertical. In other words, during movement of the carriage 110a along the annular path 11 the hopper 133a maintains a substantially vertical position.

It should be appreciated that the range of safety positions is defined as the range of permissible angles formed between the axis of the hopper B3 and the vertical direction. In the non-limiting example described and illustrated herein, the angle formed between the axis of the hopper B3 and the vertical direction may be between 0 and 45°.

In certain embodiments, the moving guide 140a extends along a portion of a substantially annular path.

Also in these embodiments, the piston rod 137a is hollow for housing the conduit (not visible in FIGS. 6-9), which is, in certain instances, flexible and configured to connect the hopper 133a and the centrifugal turbine 114a.

Figure 9:
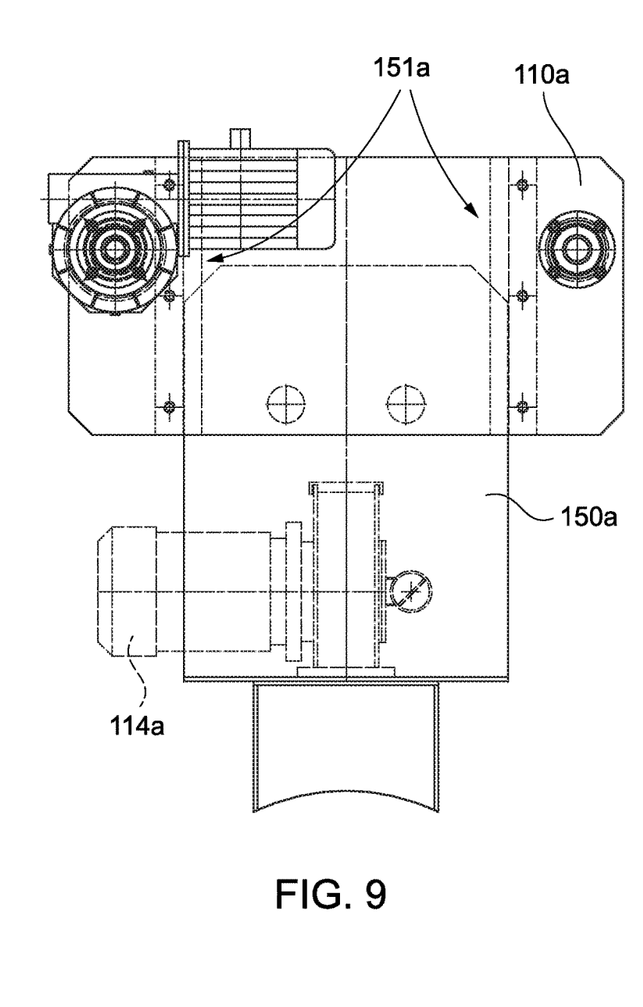

A detail of the carriage 110a is illustrated in FIG. 9. The carriage 110a is provided with a slide 150a configured to support the centrifugal turbine 114a and an adjustment guide 151a engaged in a sliding manner by the slide 150a.

In detail, the slide 150a is configured to be movable along a radial direction relative to the longitudinal axis A to enable adjustment of the position of the centrifugal turbine 114a relative to the pipeline 3.

In particular, the slide 150a is movable along the adjustment guide 151a between an initial position in which the slide 150a is fully retracted and placed in the position of maximum distance from the pipeline 3 and an end position in which the slide 150a is in the position of maximum proximity to the pipeline 3 facing the carriage 110a. In other words, the movement of the slide 150a enables an adjustment of the working distance between the outlet of the centrifugal turbine 114a and the annular junction portion 2 of the pipeline 3.

This enables the position of the centrifugal turbine 114a to be adjusted according to the diameter of the pipeline 3.

FIG. 6 and FIG. 7 show two distinct configurations of the carriage 110a adjusted according to the diameter of the pipeline 3. In particular, in the configuration of FIG. 6, wherein the pipeline 3 has a larger diameter than the pipeline 3 in FIG. 7, the slide 150a of the carriage 110a is placed in the initial position where the slide 150a is fully retracted, while in the configuration in FIG. 7, the slide 150a is placed in an advanced position relative to the initial position.

The carriage 110a is also configured to swing about an axis parallel to the longitudinal axis A.

Figure 10:
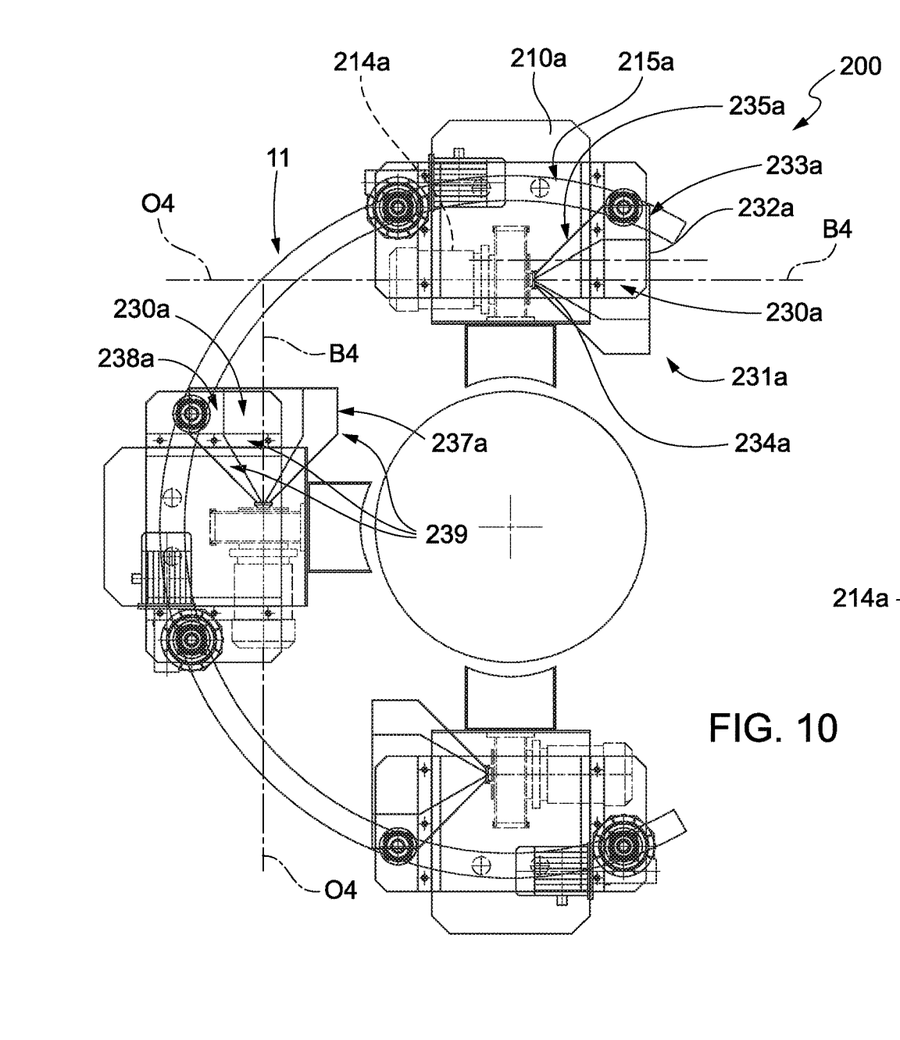
FIGS. 10 and 11 are schematic views of a system for grit blasting an annular junction portion of a pipeline on board a launching vessel according to a variant of the present disclosure in different operating positions.
Figure 11:
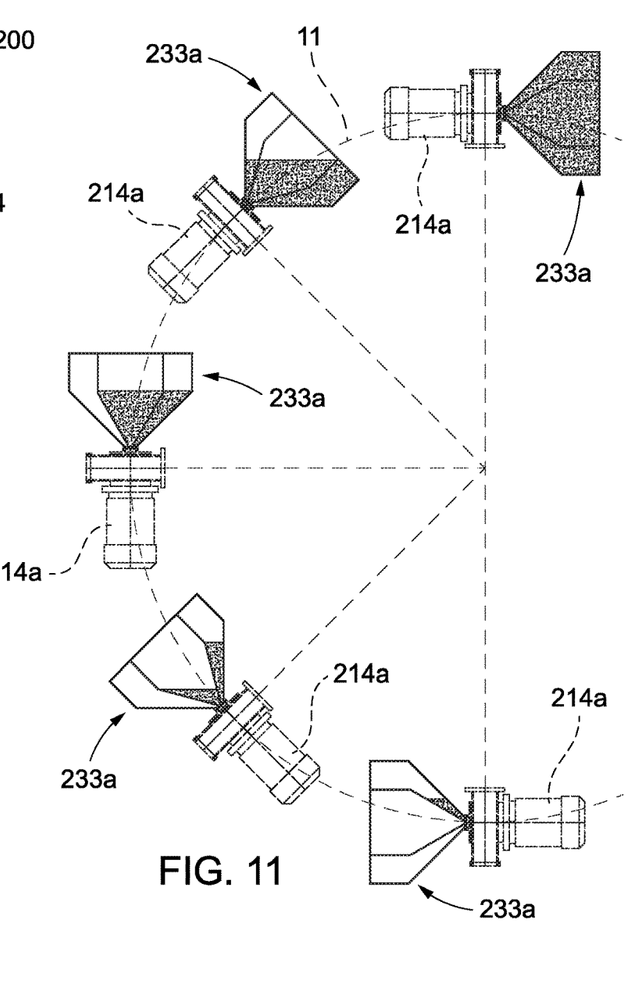

FIGS. 10-11 illustrate, in part, a system 200 configured to grit blast an annular junction portion 2 of a pipeline 3 aboard a launching vessel according to a further variant of the present disclosure.

The system 200 differs from the system 100 substantially in relation to the feeing of the grit.

Hereinafter, the same reference numbers used in FIGS. 1-9 will be used to indicate the same or similar parts.

With reference to FIG. 10 and FIG. 11, the system 200 is provided with a carriage 210a, mobile along the annular path 11 and configured to support a respective centrifugal turbine 214a, and a feeding device 215a configured to feed the grit to the respective centrifugal turbine 214a. FIGS. 9 and 10 illustrate a single turbine 214a, a single carriage 210a, and a single feeding device 215a for simplicity. It is understood that the system 200 has a structure similar to that described for the system 1 and therefore is provided with at least one further carriage, one further turbine and one further feeding device.

The centrifugal turbine 214a is configured to project grit at the pipeline 3 and rotate about a respective rotational axis O4 lying on a plane perpendicular to the longitudinal axis A of the pipeline 3. The feeding device 215a comprises a hopper 233a, which extends along a longitudinal axis B4 and is coupled to the carriage 210a, and a guiding device 231a configured to act in conjunction with the hopper 233a so as to ensure the feeding of the grit in all the operating positions of the carriage 210a.

The hopper 233a defines a feed chamber 230a suitable to contain the grit and is provided with a cover 232a configured to selectively close the feed chamber 230a.

In certain embodiments, the hopper 233a has a symmetrical structure with respect to the longitudinal axis B4 and is provided with an outlet 234a and at least one inclined wall 235a and configured to convey the grit housed in the feed chamber 230a to the outlet 234a. In certain such embodiments, the wall defines the outlet 234a.

In certain embodiments, the hopper 233a also comprises an axial wall 236a coupled to the inclined wall 235a.

In certain embodiments, the longitudinal axis B4 of the hopper 233a coincides with the rotational axis O4 of the centrifugal turbine 214a and the hopper 233a is coupled to the centrifugal turbine 214a. In certain such embodiments, the outlet 234a of the hopper 233a is coupled directly to the centrifugal turbine 214a.

In the non-limiting example described and illustrated herein, the guiding device 231a comprises at least one separator septum 237a and a separator septum 238a housed inside the feed chamber 230a of the hopper 233a and placed at a distance from each other so as to define three compartments 239 of the feed chamber 230a suitable to house the grit and connected to the outlet 234a.

In certain embodiments, the compartments 239 are not communicating with each other. According to a variant not illustrated, the separating septa are provided with one or more openings to enable the passage of grit from one compartment to another.

Figure 12:
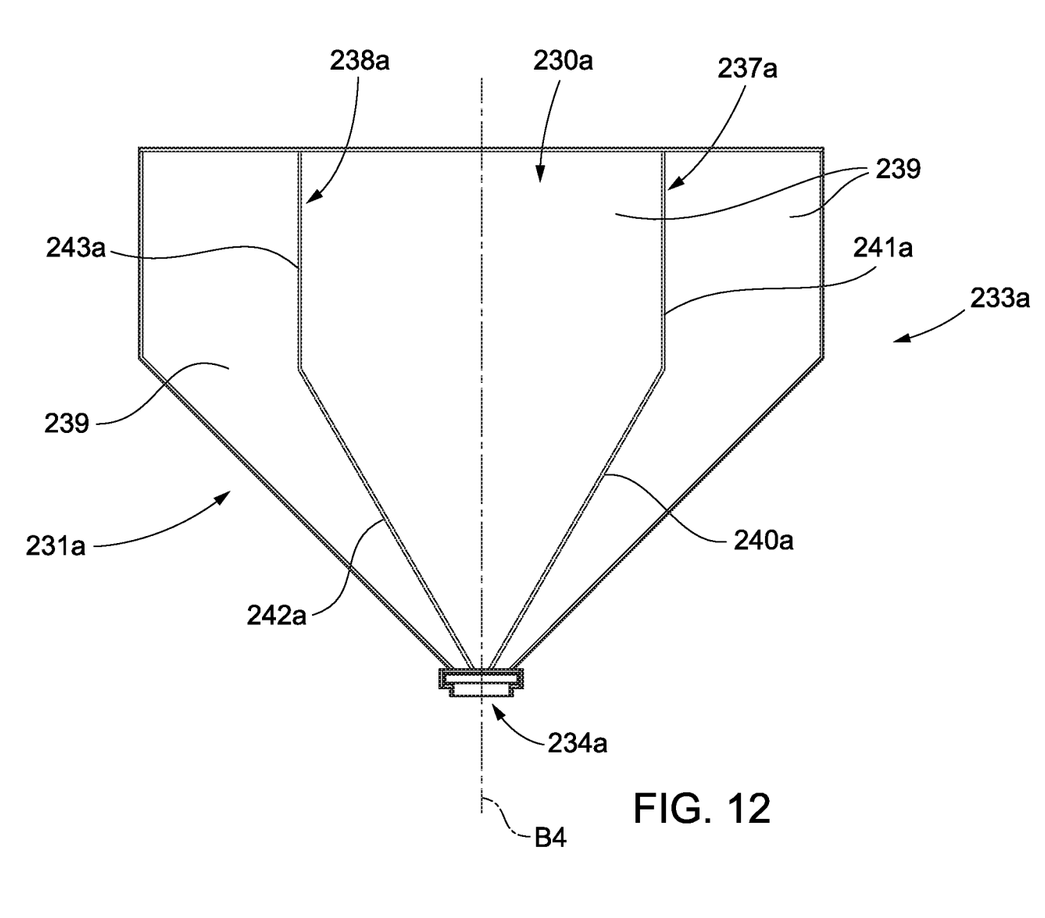
FIG. 12 is a detail of the system in FIG. 10.

With particular reference to FIG. 12, the separator septum 237a comprises at least an inclined portion 240a configured to convey the grit to the outlet 234a during movement of the carriage 210a along the annular path 11.

In certain embodiments, the inclined portion 240a extends as far as the outlet 234a of the hopper 233a.

In certain embodiments, the separator septum 237a also comprises an axial portion 241a coupled to the inclined portion 240a.

The separator septum 238a comprises at least an inclined portion 242a, configured to convey the grit to the outlet 234a during movement of the carriage 210a along the annular path 11.

In certain embodiments, the inclined portion 242a extends as far as the outlet 234a of the hopper 233a.

In certain embodiments, the separator septum 238a also comprises an axial portion 243a coupled to the inclined portion 2242a.

In certain embodiments, the separator septum 237a and the separator septum 238a are symmetrical with respect to the extension axis B4 of the hopper 233a.

As with the system 100, the carriage 210a is provided with a slide 250a configured to support the centrifugal turbine 214a and an adjustment guide 251a engaged so as to slide by the slide 250a. In this way, the slide 250a is movable along a radial direction relative to the longitudinal axis A to enable adjustment of the position of the centrifugal turbine 214a relative to the pipeline 3.

Finally, the carriage 210a is also configured to swing about an axis parallel to the longitudinal axis A.

In use, as schematically shown in FIG. 11, the grit is guided by the guiding device 213a during movement of the carriage 210a along the annular path 11. The guiding device 231a, therefore, ensures that in all operating positions of the carriage 210a the grit is appropriately conveyed to the centrifugal turbine 214a.

In certain embodiments, the feeding device 15a, 15b, 115a, 215a is coupled to an assisted feeding system. In particular, the feeding device 15a, 15b, 115a, 215a is coupled to a pneumatic grit feeding system.

The system 1, 100, 200 according to the present disclosure greatly reduces process times compared to the configurations of certain of the prior art as the present disclosure does not require any longitudinal movement of the carriages during the blasting cycle.

By virtue of the above, the system 1, 100, 200 according to the present disclosure has a relatively simple and reliable configuration adaptable to launching vessels.

Advantageously, the system 1, 100, 200 according to the present disclosure is relatively easily adaptable to a wide range of diameters due to the centrifugal turbines 14a 14b 114a 214a being positioned at different working distances and due to the geometry of the grit blast being controlled by adjustable vanes (not illustrated) arranged at the outlet or inside the outlet mouth of the centrifugal turbines 14a 14b 114a 214a. The centrifugal turbines 14a 14b 114a 214a may further move transversely to the longitudinal axis A carried by the movable frames 13a 13b and according to a circular trajectory about the longitudinal axis A, integral with the respective carriages 10a 10b 110a 210a. The centrifugal turbines 14a 14b 114a 214a may further swing about an axis parallel to the longitudinal axis A.

Advantageously, the system 1, 100, 200 according to the present disclosure is also relatively easily adaptable to a wide range of axial lengths of the annular junction portion 2, simply by adjusting the radial distance between the centrifugal turbines 14a 14b 114a 214a and the outer surface of the annular junction portion 2 by adjusting the position of the frames 13a 13b and/or employing suitable blast guide inserts made of grit abrasion-resistant material.

The system 1, 100, 200 according to the present disclosure finally has relatively reduced dimensions due to the recovery and treatment devices of the recovered abrasive material being outside the launch line.

Finally, the system according to the present disclosure guarantees relatively high safety conditions for personnel, based on the absence of flying equipment, pressure pipes, suspended loads, etc. as in certain of the solutions of certain of the prior art.

The present disclosure extends to further variants which are not explicitly described and which fall within the scope of protection of the claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A system configured to grit blast an annular junction portion of a pipeline extending along a longitudinal axis on board a laying vessel, the system comprising:
   a carriage configured to advance along an annular path about the pipeline;
   a centrifugal turbine supported by the carriage and configured to project grit towards the pipeline and rotate about a rotational axis lying on a plane orthogonal to the longitudinal axis; and
   a feed device comprising:
      a hopper coupled to the carriage, the hopper extending along an axis and defining a feed chamber, and
      a guide device configured to operate with the hopper to feed the grit to the centrifugal turbine in each of a plurality of operating positions of the carriage.

2. The system of claim 1, wherein the hopper comprises a symmetrical structure with respect to the axis that the hopper extends along.

3. The system of claim 1, wherein the hopper comprises an outlet and an inclined wall configured to convey the grit towards the outlet.

4. The system of claim 1, wherein the hopper comprises a cover configured to selectively close the defined feed chamber.

5. The system of claim 1, wherein the axis that the hopper extends along coincides with the rotational axis that the centrifugal turbine rotates about.

6. The system of claim 5, wherein the hopper is directly coupled to the centrifugal turbine.

7. The system of claim 1, wherein the guide device comprises a first separator septum housed within the feed chamber defined by the hopper and configured to define at least two compartments of the feed chamber to house the grit.

8. The system of claim 7, wherein the first separator septum comprises at least one first inclined portion configured to convey the grit housed in the at least two compartments towards an outlet of the hopper during movement of the carriage along the annular path.

9. The system of claim 8, wherein the guide device comprises a second separator septum housed within the feed chamber defined by the hopper at a distance from the first separator septum to define at least three compartments of the feed chamber to house the grit.

10. The system of claim 9, wherein the second separator septum comprises at least one second inclined portion configured to convey the grit housed in the at least three compartments towards the outlet of the hopper during movement of the carriage along the annular path.

11. The system of claim 9, wherein the first separator septum and the second separator septum are symmetrical with respect to the axis that the hopper extends along.

12. The system of claim 1, wherein the guide device comprises an articulator configured to maintain the hopper in a position within a range of safety positions during movement of the carriage along the annular path, the range of safety positions defined such that the feeding of the grit to the centrifugal turbine occurs by gravity and without spillage of the grit during movement of the carriage along the annular path.

13. The system of claim 12, wherein the hopper is non-coaxial with the centrifugal turbine and defines an opening.

14. The system of claim 12, wherein the feeding device comprises a conduit configured to connect the hopper to the centrifugal turbine.

15. The system of claim 14, wherein the conduit comprises a flexible conduit.

16. The system of claim 12, wherein the articulator comprises a piston rod coupled to an outlet of the hopper and an actuator coupled to an inlet of the hopper.

17. The system of claim 16, wherein the actuator comprises two actuators coupled to sides of the inlet of the hopper.

18. The system of claim 16, wherein the actuator comprises a moving guide and an arm coupled to the inlet of the hopper and defining an end moveable along the moving guide.

19. The system of claim 18, wherein the moving guide extends along a portion of an annular path.

20. The system of claim 16, wherein the piston rod comprises a hollow piston rod configured to house a portion of a conduit of the feeding device.

21. The system of claim 1, wherein the carriage is configured to controllably swing about an axis parallel to the longitudinal axis.

22. The system of claim 1, wherein the centrifugal turbine is configured to controllably swing about an axis parallel to the longitudinal axis.

23. The system of claim 1, further comprising:
at least two guides configured to define complementary portions of the annular path; and
at least two frames which respectively support the at least two guides and are selectively movable in a direction transversal to the longitudinal axis.

24. The system of claim 23, wherein:
each guide comprises two spaced apart half rings arranged parallel with respect to each other on planes orthogonal to the longitudinal axis, and
each frame comprises two C-shaped plates configured to support a respective one of the half rings.

25. The system of claim 24, wherein the C-shaped plates of each frame are configured to be spaced apart at a distance greater than an axial length of the annular junction portion of the pipeline.

26. The system of claim 24, wherein each half ring defines a coupling face fixed to a respective one of the C-shaped plates with an external face that defines a groove and an inner toothed edge.

27. The system of claim 26, wherein the carriage comprises a pinion moveable by an electrical motor and configured to engage the inner toothed edge defined by a respective one of the half rings.

28. The system of claim 27, wherein the carriage comprises a strut and two arms, each arm having a first end fixed to a respective end of the strut and a second, opposite end configured to slideably engage the groove defined by a respective one of the half rings.

29. The system of claim 23, further comprising a casing which defines a processing chamber, the casing being divided into two half shells, wherein each half shell is coupled to a respective one of frames.

30. The system of claim 1, wherein the centrifugal turbine comprises an outlet mouth elongated in a direction parallel to the longitudinal axis.

31. The system of claim 1, wherein the carriage comprises a slide configured to support the centrifugal turbine and an adjusting guide configured to slideably engage the slide.

32. The system of claim 31, wherein the slide is configured to move along a radial direction with respect to the longitudinal axis to adjust a position of the centrifugal turbine with respect to the pipeline.

33. The system of claim 1, further comprising:
another carriage configured to advance along the annular path about the pipeline;
another centrifugal turbine supported by the other carriage and configured to project grit towards the pipeline and rotate about another rotational axis lying on another plane orthogonal to the longitudinal axis; and
another feed device configured to feed the grit to the other centrifugal turbine.

34. The system of claim 33, wherein the other feed device comprises another hopper coupled to the other carriage and another guide device configured to operate with the other hopper to feed the grit to the other centrifugal turbine in each of a plurality of operating positions of the other carriage.

35. The system of claim 33, wherein the carriage and the other carriage are arranged at 180° with respect to each other along the annular path.

36. The system of claim 33, wherein the carriage and the other carriage are identical.

37. The system of claim 33, wherein the centrifugal turbine and the other centrifugal turbine are identical.

38. A launching vessel comprising:
a system configured to grit blast an annular junction portion of a pipeline extending along a longitudinal axis on board a laying vessel, the system comprising:
a carriage configured to advance along an annular path about the pipeline;
a centrifugal turbine supported by the carriage and configured to project grit towards the pipeline and rotate about a rotational axis lying on a plane orthogonal to the longitudinal axis; and
a feed device comprising:
a hopper coupled to the carriage, the hopper extending along an axis and defining a feed chamber, and
a guide device configured to operate with the hopper to feed the grit to the centrifugal turbine in each of a plurality of operating positions of the carriage.

39. A method of grit blasting an annular junction portion of a pipeline extending along a longitudinal axis, the method comprising:
advancing a carriage along an annular path about the pipeline;
projecting grit towards the pipeline via a centrifugal turbine configured to rotate about a rotational axis lying on a plane orthogonal to the longitudinal axis; and
in each of a plurality of operating positions of the carriage, feeding the grit to the centrifugal turbine by a feeding device comprising a hopper coupled to the carriage and a guide device.

40. The method of claim 39, further comprising controllably swinging the carriage about an axis parallel to the longitudinal axis.

41. The method of claim 39, further comprising controllably swinging the centrifugal turbine about an axis parallel to the longitudinal axis.

42. The method of claim 39, further comprising moving two frames in a direction transversal to the longitudinal axis, wherein each frame supports a guide that defines a respective portion of the annular path.

43. The method of claim 42, wherein moving the two frames comprises one of juxtaposing the frames one to the other to define the annular path about the pipeline and moving the frames away from each other to enable a loading of the pipeline.

44. The method of claim 42, wherein advancing the carriage along the annular path about the pipeline comprises advancing the carriage on a guide and advancing another carriage on another guide, the other carriage supporting another centrifugal turbine configured to project grit at the pipeline and rotate about another rotational axis lying on another plane orthogonal to the longitudinal axis, the other carriage supporting another feeding device configured to feed grit to the other centrifugal turbine.

45. The method of claim 44, wherein the carriage and the other carriage are arranged at 180° with respect to each other along the annular path.

46. The method of claim 44, further comprising controllably swinging the other about an axis parallel to the longitudinal axis.

47. The method of claim 44, further comprising controllably swinging the other centrifugal turbine about another axis parallel to the longitudinal axis.

48. The method of claim 44, wherein the other feed device comprises another hopper coupled to the other carriage and another guide device configured to operate with the other hopper to feed the grit to the other centrifugal turbine in each of a plurality of operating positions of the other carriage.

* * * * *